(12) United States Patent
Januszewski

(10) Patent No.: US 10,031,706 B2
(45) Date of Patent: Jul. 24, 2018

(54) MANAGING PRINT JOBS

(71) Applicant: Konica Minolta Laboratory U.S.A., Inc., San Mateo, CA (US)

(72) Inventor: Michael Januszewski, Lafayette, CO (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 71 days.

(21) Appl. No.: 14/871,893

(22) Filed: Sep. 30, 2015

(65) Prior Publication Data
US 2017/0090831 A1 Mar. 30, 2017

(51) Int. Cl.
*G06F 3/12* (2006.01)

(52) U.S. Cl.
CPC .......... *G06F 3/1222* (2013.01); *G06F 3/1232* (2013.01); *G06F 3/1236* (2013.01); *G06F 3/1238* (2013.01); *G06F 3/1267* (2013.01); *G06F 3/1286* (2013.01); *G06F 3/1287* (2013.01)

(58) Field of Classification Search
CPC .... G06F 3/1222; G06F 3/1238; G06F 3/1287; G06F 3/1286; G06F 3/1236; G06F 3/1267; G06F 3/1232
USPC ....................................... 358/1.14
See application file for complete search history.

(56) References Cited

U.S. PATENT DOCUMENTS

| | | | |
|---|---|---|---|
| 8,516,308 B1* | 8/2013 | Gill | H04L 67/34 714/26 |
| 9,134,936 B2* | 9/2015 | Monden | G06F 3/1232 |
| 2010/0309510 A1 | 12/2010 | Hansen | |
| 2012/0069386 A1* | 3/2012 | St. Laurent | G06F 3/1204 358/1.15 |

FOREIGN PATENT DOCUMENTS

JP   2012064030 A   3/2012

* cited by examiner

*Primary Examiner* — Neil R McLean
*Assistant Examiner* — Darryl V Dottin
(74) *Attorney, Agent, or Firm* — Osha Liang LLP (57) ABSTRACT

A method performed by a print service provider (PSP) for printing, including: (a) obtaining from a network a print job issued by a user mobile device and specifying a printer feature; (b) obtaining a location of the user mobile device; (c) determining a first printer having the printer feature and located within a predetermined distance of the location of the user mobile device; (d) sending a notification identifying the first printer to the user mobile device; (e) checking if a confirmation for the first printer issued by the user mobile device is obtained; (f) if the confirmation is not obtained in the step (e), repeating the steps (b) through (e); and (g) if the confirmation is obtained in the step (e), sending the print job to the first printer, where the first printer generates a hardcopy document from the print job using printer requirement.

20 Claims, 4 Drawing Sheets

MANAGING PRINT JOBS

BACKGROUND

Mobile devices including smart phones and tablet personal computers (PCs) are ubiquitous. The users of these mobile devices frequently wish to print (i.e., generate a hardcopy) various types of electronic documents (EDs). However, as the mobile devices are not physically connected to a printer and are often used in public spaces, it can be difficult for the users to actually find a printer and print the EDs.

Further, in order to correctly print these EDs, it is often necessary for the printer to have one or more specific printer features (e.g., color printing, duplex printing, three-hole punching, etc.). The mobile device users do not know whether the nearest printer, especially the nearest public printer, has the necessary printer features. Regardless, many mobile device users still wish to print EDs from their mobile devices.

SUMMARY

In general, in one aspect, the invention relates to a method performed by a print service provider (PSP) for printing. The method comprises: (a) obtaining from a network a print job issued by a user mobile device and specifying a printer feature; (b) obtaining a location of the user mobile device; (c) determining a first printer comprising the printer feature and located within a predetermined distance of the location of the user mobile device; (d) sending a notification identifying the first printer to the user mobile device; (e) checking if a confirmation for the first printer issued by the user mobile device is obtained; (f) if the confirmation is not obtained in the step (e), repeating the steps (b) through (e); and (g) if the confirmation is obtained in the step (e), sending the print job to the first printer, wherein the first printer generates a hardcopy document from the print job using printer requirement.

In general, in one aspect, the invention relates to a non-transitory computer readable medium (CRM) storing computer readable program code embodied therein. The computer readable program code causes a print service provider (PSP) to: (a) obtain from a network a print job issued by a user mobile device and specifying a printer feature; (b) obtain a location of the user mobile device; (c) determine a first printer comprising the printer feature and located within a predetermined distance of the location of the user mobile device; (d) send a notification identifying the first printer to the user mobile device; (e) check if a confirmation for the first printer issued by the user mobile device is obtained; (f) if the confirmation is not obtained in the step (e), repeat the steps (b) through (e); and (g) if the confirmation is obtained in the step (e), send the print job to the first printer, wherein the first printer generates a hardcopy document from the print job using printer feature.

In general, in one aspect, the invention relates to a system for printing. The system comprises: a buffer that stores a print job issued by a user mobile device and specifying a printer feature, wherein the user mobile device is operated by a user; a matching engine that: (a) obtains a location of the user mobile device; and (b) determines a first printer and a second printer having the printer feature and located within a predetermined distance of the location of the user mobile device; and a messaging engine that: (c) sends a notification identifying the first printer and the second printer to the user mobile device; (d) checks if a confirmation for the first printer issued by the user mobile device is obtained; and (e) if the confirmation is obtained in the step (d), sends the print job to the first printer, wherein steps (a)-(d) are repeated if the confirmation is not obtained in the step (d), and wherein the first printer generates a hardcopy from the print job using the printer feature.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for printing. Specifically, a print job issued by a mobile device and specifying a printer feature is received by a print service provider. The print service provider then determines one or more printers near the mobile device that have the printer feature and/or are available to generate the hardcopy document within a specified time constraint. The printer feature may be any attribute, function, or capability of the printer that is necessary or requested to generate a hardcopy document from the print job. Example printer features include one or more of color printing, duplex printing, three-hole punching, paper sizes, specific fonts supported by the printer, specific software or versions of software executing on the printer, economy modes, low-power modes, high-speed printing, etc. The printers may be at fixed and known locations. GPS coordinates of the mobile device may be used to determine the distance between the mobile device and each printer. The user of the mobile device is able to select a printer, and the print job is subsequently sent to the selected printer.

Figure 1:
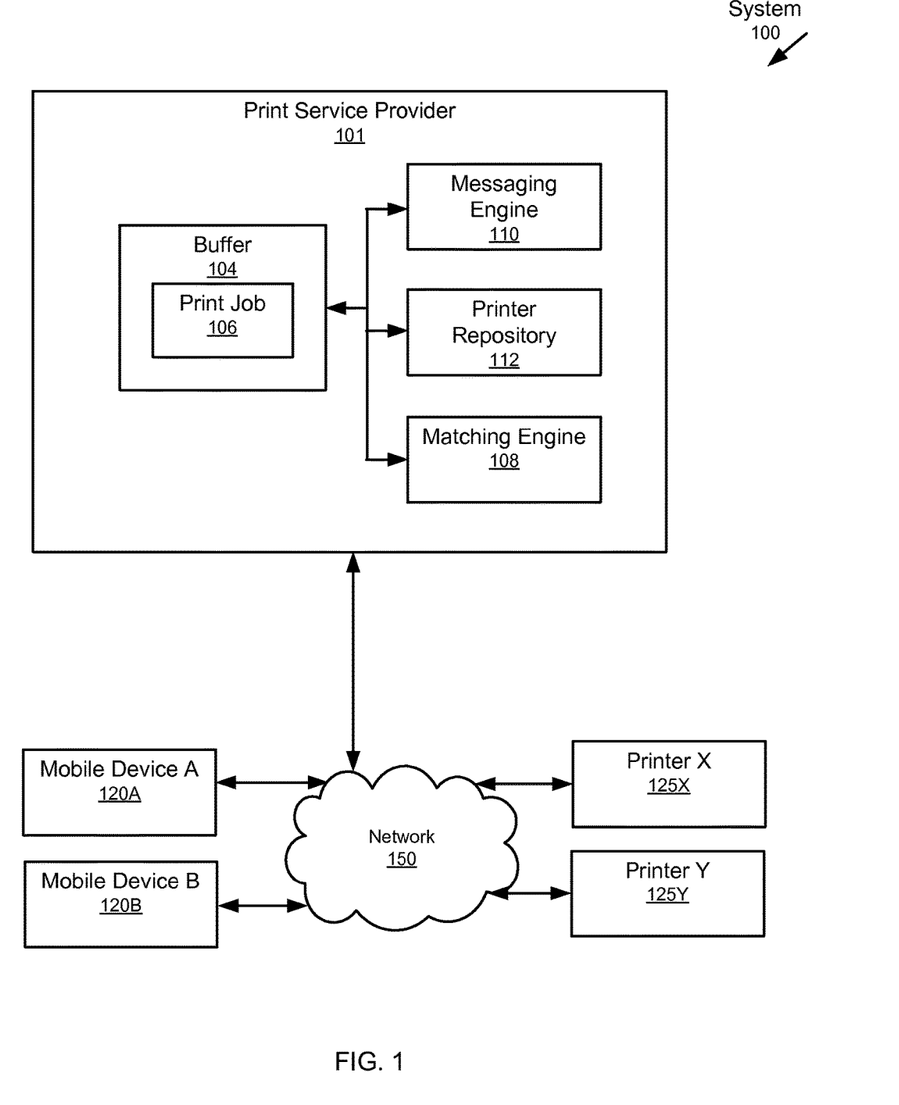
FIG. 1 shows a system in accordance with one or more embodiments of the invention.

FIG. 1 shows a system (100) in accordance with one or more embodiments of the invention. As shown in FIG. 1, the system (100) has multiple components including, for example, a print service provider (101), one or more mobile devices (i.e., Mobile Device A (120A), Mobile Device B (120B)), and one or more printers (i.e., Printer X (125X), Printer Y (125Y)). Each of these components (101, 120A, 120B, 125X, 125Y) may be connected by a network (150) of any size having wired and/or wireless segments. Each of these components is discussed below.

In one more embodiments of the invention, the system (100) includes multiple printers (125X, 125Y). Although FIG. 1 only shows two printers, there may be any number of printers. Each printer may have different printer features. For example, one or more printers may be capable of color printing. As another example, one or more printers may be capable of duplex printing. As another example, one or more printers may be loaded with various paper sizes. As another example, one or more printers may be capable of punching holes in printed pages and/or stapling printed pages. As yet another example, special fonts or software (e.g., rendering engines) may be installed on one or more printers.

In one or more embodiments of the invention, the printers (125X, 125Y) are fixed and have known locations. In other words, the printers (125X, 125Y) are stationary and the locations (e.g., GPS coordinates) of the printers (125X, 125Y) are known. At any given time, one or more printers may be occupied and unable to print. Similarly, at any given time, one or more printers may be unoccupied and ready to print. One or more of the printers (125X, 125Y) may be public printers and available to anyone for free or for a fee. One or more of the printers (125X, 125Y) may only be available to users who have existing accounts and may require users to input an authentication credential (e.g., password, personal identification number (PIN), biometrics, etc.) before a hardcopy is generated.

In one or more embodiments of the invention, the system (100) includes one or more mobile devices (120A, 120B). Each mobile device (120A, 120B) may correspond to a smart phone, a personal digital assistant (PDA), a tablet PC, a laptop computer, etc. Each mobile device is operated by a user. Although only two mobile devices (120A, 120B) are shown in FIG. 1, the system (100) may have any number of mobile devices.

In one or more embodiments of the invention, each mobile device (120A, 120B) generates and issues print jobs. Each print job may include the content (e.g., word processing document, slide, spreadsheet, webpage, image, photograph, etc.) to be printed and specify one or more printer features needed to correctly print the content. As discussed above, example printer features include color printing, duplex printing, hole-punching, etc. The printer features may be specified within the print job and/or within the content to be printed (e.g., as attributes within tags). Further, the user may specify printer features (e.g., high speed printing, low-power consumption printing, a time constraint for printing (e.g., within the next 2 mins), etc.) to be included in the print job. The print job may also include an authentication credential (e.g., PIN, password, biometric, etc.) of the user, an identification (e.g., user name) of the user or the mobile device (e.g., cell number, serial number, etc.), a print job number, etc.

In one or more embodiments of the invention, each mobile device (120A, 120B) includes a GPS receiver. In other words, each mobile device may periodically, or at random intervals, be updated with its GPS coordinates. The mobile device may include these GPS coordinates in print jobs. Additionally or alternatively, these GPS coordinates may be sent separately from the print jobs (discussed below). Like the print job, the updated GPS coordinates may be sent with an authentication credential of the user, an identification of the user or mobile device, a print job number, etc.

In one or more embodiments of the invention, each mobile device (120A, 120B) may receive notifications identifying one or more printers and send confirmations for one of the identified printers (discussed below). The mobile device (120A, 120B) displays the notification to the user and allows the user to select (e.g., via a GUI widget, a webpage with a URL link, etc.) one of the identified printers for the confirmation. The notifications and/or confirmations may be exchanged using email, text messaging, social network messaging, etc. The notifications and/or confirmations may be exchanged via the network (150).

Those skilled in the art, having the benefit of this detailed description, will appreciate that while the printers (125X, 125Y) are usually fixed, the mobile devices (120A, 120B) are not. Accordingly, over time, the distance between a mobile device and each of the printers (125X, 125Y) may change.

In one or more embodiments of the invention, the system (100) includes the print service provider (101). As shown in FIG. 1, the print service provider (101) has multiple components including a buffer (104), a matching engine (108), a printer repository (112), and a messaging engine (110). Each of these components (104, 108, 110, 112) may be located on the same computing device (e.g., server, mainframe, personal computer, mobile computer, etc.) or may be located on different computing devices connected by a network (e.g., network (150) or another network (not shown)).

In one or more embodiments of the invention, the print service provider (101) includes the buffer (104). The buffer (104) may be implemented in hardware (i.e., circuitry), software, or any combination thereof. The buffer (104) is configured to store and queue print jobs (e.g., print job (106)) received over the network (150) from the mobile devices (120A, 120B). As discussed above, the print job (106) may specify one or more printer features. The print job (106) may also include the location (e.g., GPS coordinates) of the mobile device that issued the print job (106). The buffer (104) may also store any updated locations (e.g., updated GPS coordinates) sent by one or more mobile devices (120A, 120B).

In one or more embodiments of the invention, the print service provider (101) includes a printer repository (112). The printer repository (112) may be implemented in hardware (i.e., circuitry), software, or any combination thereof. The printer repository (112) stores the locations (e.g., GPS coordinates) of the multiple printers (125X, 125Y) and the printer features of each printer (125X, 125Y). The printer repository (112) may be an array, a linked-list, a lookup table, or any other type of data structure.

In one or more embodiments of the invention, the print service provider (101) includes the matching engine (108). The matching engine (108) may be implemented in hardware (i.e., circuitry), software, or any combination thereof. The matching engine (108) is configured to identify one or more printers (125X, 125Y) to process (i.e., generate a hardcopy document) the print job (106). Accordingly, the matching engine (108) may search the printer repository (112) for printers that have the printer features specified in the print job (106).

In one or more embodiments of the invention, the matching engine (108) calculates the distance (e.g., using the GPS coordinates) between each printer having the printer features specified in the print job (106) and the location, or updated location, of the mobile device that issued the print job (106). The location of each printer may be retrieved from the printer repository (112). This distance calculation may be repeated as the location of the mobile device changes. For example, the distance calculation may be repeated each time an updated location (e.g., updated GPS coordinates) is received from a mobile device that previously issued a print job that has not yet been sent to a printer. In one or more embodiments of the invention, only printers within a predetermined distance of the mobile device that issued the print job (106) are deemed eligible to process the print job (106).

In one or more embodiments of the invention, the print service provider (101) includes the messaging engine (110). The messaging engine (110) is configured to send notifications to mobile devices (120A, 120B) that have issued print jobs. Each notification may identify one or more printers that have the printer features specified in the print job and that are within a predetermined distance of the mobile device that issued the print job. The notification may be in the format of a text message, an email, a fax, a webpage with URL links, a GUI, an audio recording, a social network message, etc. The notification is accessible by the mobile device that issued the print job.

In one or more embodiments of the invention, the messaging engine (110) is configured to obtain confirmations from the mobile device (120A, 120B). A confirmation is effectively a response to a notification. Specifically, a confirmation may be a selection of one printer identified in the notification (if multiple printers are identified in the notification) and/or an approval to send the print job to the printer. The selection and approval are made by the user of the mobile device (120A, 120B). The selection may be made by manipulating a GUI widget, entering a number or code in a text message or email, a voice command, clicking a URL link, etc. In one or more embodiments of the invention, the messaging engine (110) sends the print job to the approved printer (125X, 125Y). Like the notification, the confirmation may take any format (e.g., email, fax, URL selection, etc.).

Although the system (100) in FIG. 1 is shown as having only one print service provider (101), there may be multiple print service providers each having similar components and each connected to all or a subset of the printers. Further, the system (100) may have additional components that are not shown.

Figure 2:
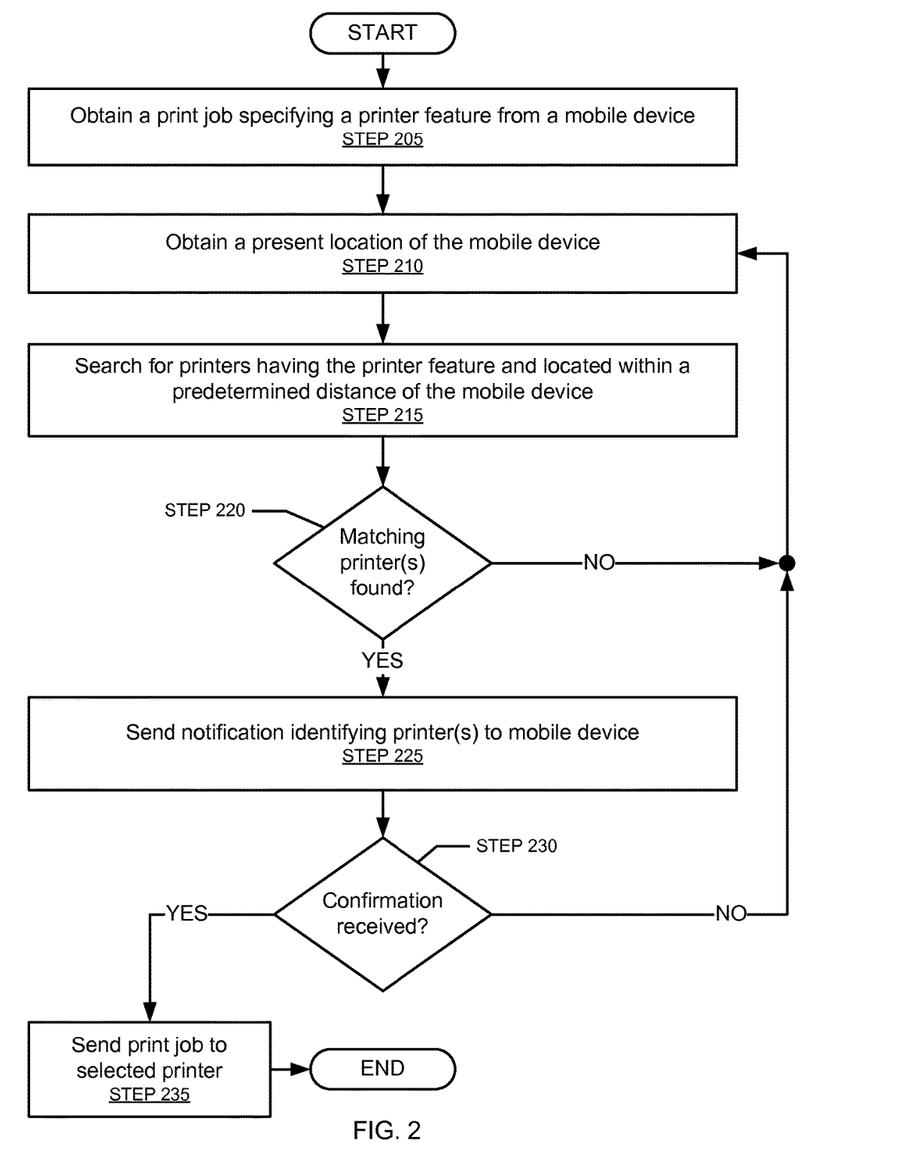
FIG. 2 shows a flowchart in accordance with one or more embodiments of the invention.

FIG. 2 shows a flowchart in accordance with one or more embodiments of the invention. The flowchart depicts a process for printing. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, a print job is obtained (STEP 205). The print job may be issued by a mobile device and obtained by a print service provider over a network. The print job may specify the content to be printed and one or more printer features, such as those mentioned above. One or more printer features may be specified within the print job and/or within the content to be printed (e.g., as attributes within tags). Further, one or more print features in the print job may be specified by a user/operator of the mobile device (e.g., high speed printing, low-power consumption printing, a time constraint for printing (e.g., within the next 2 mins), etc.). The print job may also include an authentication credential (e.g., PIN, password, biometric, etc.) of the user, an identification (e.g., user name) of the user or the mobile device (e.g., cell number, serial number, etc.), a print job number, etc.

In STEP 210, a present location of the mobile device is obtained. The present location may be specified in GPS coordinates. The present location may be included in the print job (STEP 205). Additionally or alternatively, the present location of the mobile device may be periodically provided by the mobile device to the print service provider. If provided separately from the print job, the locations may be accompanied with the authentication credential, identification of the mobile device, print job number, etc. in order to link the provided location with the previously received print job (STEP 205).

In STEP 215, a search is executed by the print service provider for printers both having the printer feature and located within a predetermined distance (e.g., 200 feet, 1 mile, 5 miles, etc.) of the mobile device that issued the print job. The predetermined distance may be specified by the user of the mobile device and included in the print job. The search operation may include accessing a printer repository (e.g., printer repository (215)) storing the locations (e.g., GPS coordinates) of the printers and the printer features of each printer. Distances may be calculated between the mobile device and each printer having the printer feature(s) specified in the print job.

In STEP 220, a determination is made by the print service provider whether at least one matching printer has been identified. When at least one matching printer has been identified, the process proceeds to STEP 225. When no matching printers have been identified, the process returns to STEP 210. In one or more embodiments, a notice regarding no matching printers may be forwarded from the print service provider to the mobile device, and the mobile device may inform the user of the fact that no matching printers satisfying the requested printer features are found within the predetermined distance from user's current location. Those skilled in the art, having the benefit of this detailed description, will appreciate that although there might not be any matching printers right now, as the mobile device relocates, one or more printers having the necessary printer features may fall within the predetermined distance of the mobile device.

In STEP 225, a notification is sent from the print service provider to the mobile device over the network. The notification identifies the one or more printers that have the printer features and are within the predetermined distance from the mobile device. Additionally or alternatively, the notification may include directions to navigate from the last reported location of the mobile device to the location of each identified printer. Also additionally or alternatively, the notification may include print fee for each of the identified one or more printers. The notification may be in any format including a GUI, a webpage with URL links, an email, a text message, a social network message, etc. The notification may be displayed on the mobile device that issued the print job. In one or more embodiments, the identified one or more printers are presented on a display of the mobile device in such a manner where these printers are plotted on a plane coordinate of which X and Y axes respectively represent distance and print fee. Parameters of the X and Y axes can be altered according to the user's preference. For instance, distance versus print completion time, print completion time versus print fee, and so on can be chosen by the user of the mobile device.

In STEP 230, a determination is made by the printer service provider whether a confirmation has been received from the mobile device. After the notification is sent (STEP 225), a timer may be started. The timer may be of any duration (e.g., 30 seconds, 60 seconds, 120 seconds, etc.). This determination may be made following the expiration of the timer. The confirmation is effectively a response to the notification. The confirmation may be a selection of one printer identified in the notification (if multiple printers are identified in the notification) and/or an approval to send the print job to the printer. The selection and approval are made by the user of the mobile device. The confirmation may be generated by manipulating a GUI widget, entering a number or code in a text message or email, a voice command, clicking a URL link, etc. Like the notification, the confirmation may take any format (e.g., email, fax, social network message, etc.). When a confirmation has been received, the process proceeds to STEP 235. When a confirmation has not been received (e.g., timer has expired and/or user explicitly declines to print to any of the printers in the sent notification), the process returns to STEP 210. In other words, the process continues to track the current (i.e., updated) location of the mobile device and search for nearby printers having the necessary printer features.

In STEP 235, the print job is sent from the print service provider to the selected printer for generation of a hardcopy. As discussed above, the print job may include an authentication credential and the user of the mobile device may input the same/matching authentication credential into the printer in order to trigger printing.

Figure 3:
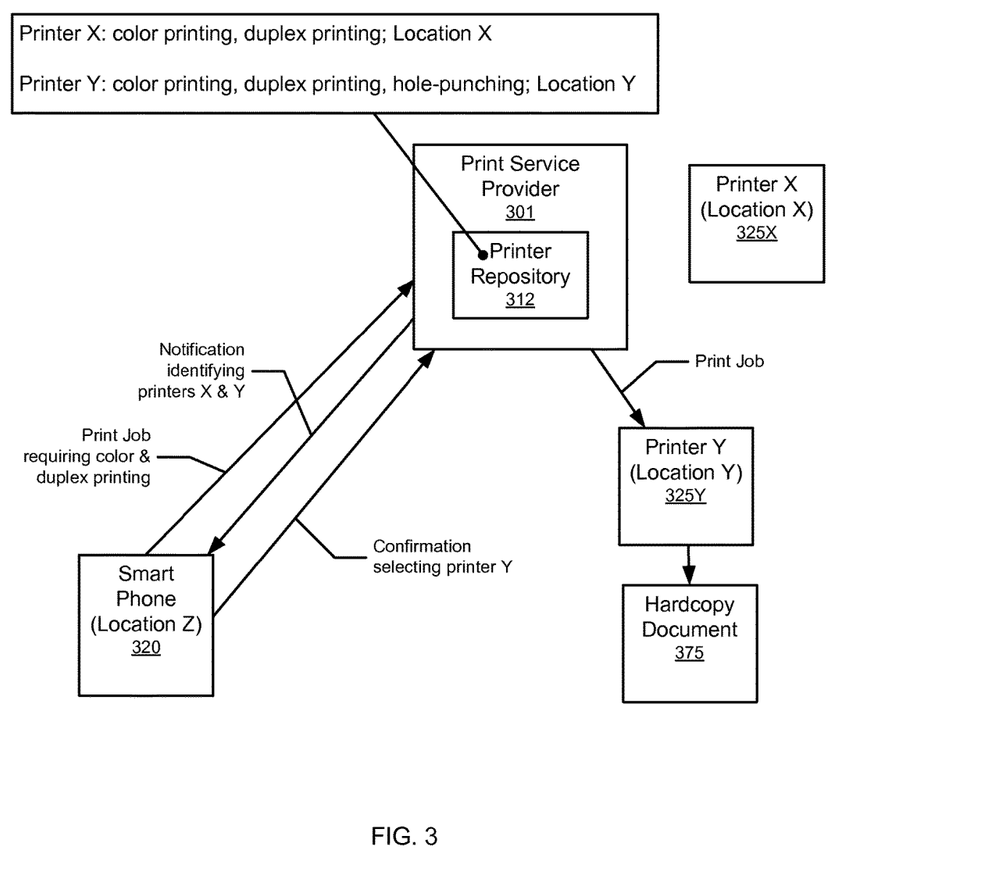
FIG. 3 shows an implementation example in accordance with one or more embodiments of the invention.

FIG. 3 shows an implementation example in accordance with one or more embodiments of the invention. The example shown in FIG. 3 includes a smart phone (320), two printers (Printer X (325X), Printer Y (325Y)), and a print service provider (301). The smart phone (320), printer Y (325Y), and printer X (325X) are presently located at location Z, location Y, and location X, respectively. Each printer (325X, 325Y) has multiple printer features. The print service provider (301) includes a printer repository (312) storing records for each printer (325X, 325Y). As shown in FIG. 3, the printer repository (312) records/stores the location of each printer and the printer features of each printer. For example, as shown in FIG. 3, printer X has the following printer features: color printing and duplex printing. As another example, printer Y has the following printer features: color printing, duplex printing, and hole-punching.

Still referring to FIG. 3, the smart phone (320) issues a print job to the print service provider (301). The print job specifies/requires two printer features: color printing and duplex printing. The print job also specifies the location (i.e., location Z) of the smart phone (320). In response to receiving the print job, the print service provider (301) searches the printer repository (312) for printers that are both capable of color printing and duplex printing and located within a predetermined distance (e.g., 500 feet) from the location of the smart phone (320). The print service provider (301) identifies both printer X (325X) and printer Y (325Y) as having the required printer features and being within 500 feet of location Z (i.e., the present location of the smart phone (320)).

In response to identifying printer X (325X) and printer Y (325Y), the print service provider (301) sends a notification to the smart phone (320). The notification identifies both printer X (325X) and printer Y (325Y). The notification also includes directions to navigate from location Z to location X and location Y (i.e., directions to navigate from the present location of the smart phone (320) to the locations of the printers (325X, 325Y)). The user of the smart phone (320) is able to view the notification and select one of the printers. In this example, the user selects printer Y (325Y). A confirmation selecting printer Y (325Y) is issued in response to the notification and sent to the print service provider (301). In response to the confirmation for printer Y (325Y), the print job is sent to printer Y (325Y) in order for printer Y (325Y) to generate the hardcopy document (375). The user of the smart phone retrieves the hardcopy document (375) from printer Y (325Y).

One or more embodiments of the invention may have the following advantages: the ability to match printers to printer features specified in a print job; the ability to print on printers within a predetermined distance from a mobile device; the ability to select a printer to generate a hardcopy document when multiple printers are within a predetermined distance of a mobile device; the ability to issue notifications identifying multiple printers and issue confirmations selecting one of the printers on which to print; etc.

Figure 4:
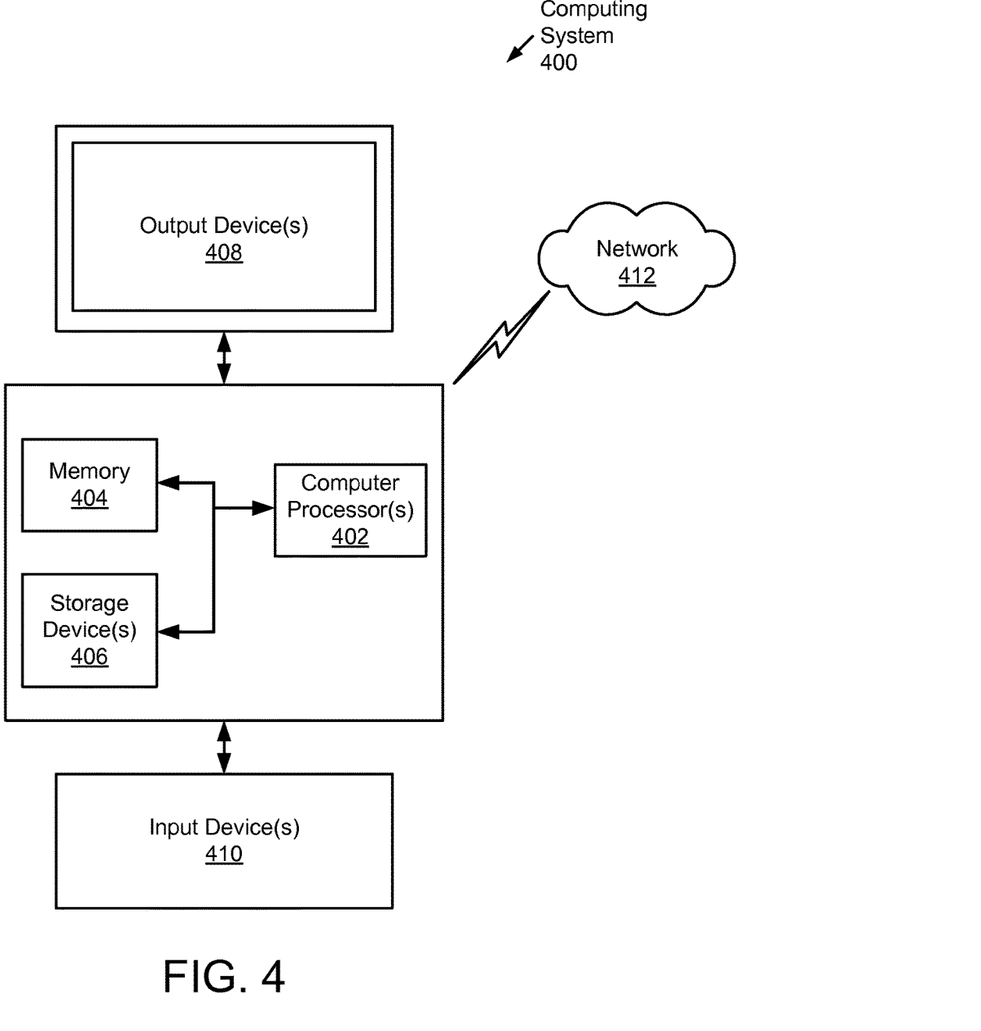
FIG. 4 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method performed by a print service provider (PSP) for printing, comprising:
    obtaining from a network a print job issued by a user mobile device and specifying a printer feature, a print job identification (ID), and an initial location of the user mobile device;
    obtaining the initial location of the user mobile device from the print job;
    determining a first printer comprising the printer feature and located within a predetermined distance of the initial location of the user mobile device;
    sending a notification identifying the first printer to the user mobile device;
    obtaining the print job ID with an updated location of the user mobile device different from the initial location of the user mobile device after sending the notification, wherein the print job ID with the updated location are sent by the user mobile device;
    determining a second printer comprising the printer feature and located within the predetermined distance of the updated location;
    sending an updated notification identifying the second printer to the user mobile device;
    obtaining a confirmation for the second printer issued by the user mobile device in response to sending the updated notification;
    sending the print job to the second printer in response to the confirmation,
    wherein the first printer generates a hardcopy document from the print job using the printer feature.

2. The method of claim 1, further comprising:
    determining a third printer comprising the printer feature and located within the predetermined distance of the updated location of the user mobile device,
    wherein the updated notification further identifies the third printer,
    wherein the updated notification comprises an XY plot comprising the second printer and the third printer,
    wherein the XY plot further comprises a first axis representing distance from the user mobile device and a second axis representing at least one selected from a group consisting of printing fee for the print job and completion time for the print job, and
    wherein the confirmation is a selection of the second printer by a user of the user mobile device.

3. The method of claim 2, wherein the print job further specifies an authentication credential, and wherein the user inputs the authentication credential at the second printer before the second printer generates the hardcopy document.

4. The method of claim 1, wherein the printer feature is at least one selected from a group consisting of color printing, duplex printing, three-hole punching, and a paper size printing.

5. The method of claim 1, wherein the print job further specifies a time constraint, and wherein the second printer is available to generate the hardcopy document within the time constraint.

6. The method of claim 1, wherein the location is specified using global positioning system (GPS) coordinates.

7. The method of claim 1, wherein the confirmation is at least one selected from a group consisting of a text message and an email.

8. The method of claim 1, wherein the updated notification comprises a uniform resource locator (URL) link that is selected by the user to generate the confirmation.

9. A non-transitory computer readable medium (CRM) storing computer readable program code embodied therein that causes a print service provider (PSP) to:
    obtain from a network a print job issued by a user mobile device and specifying a printer feature, a print job identification (ID), and an initial location of the user mobile device;
    obtain the initial location of the user mobile device from the print job;
    determine a first printer comprising the printer feature and located within a predetermined distance of the location of the user mobile device;
    send a notification identifying the first printer to the user mobile device;
    obtain the print job ID with an updated location of the user mobile device different from the initial location of the user mobile device after sending the notification, wherein the print job ID with the updated location are sent by the user mobile device;
    determine a second printer comprising the printer feature and located within the predetermined distance of the updated location;
    send an updated notification identifying the second printer to the user mobile device;
    obtain a confirmation for the second printer issued by the user mobile device in response to sending the updated notification;
    send the print job to the second printer in response to the confirmation,
    wherein the second printer generates a hardcopy document from the print job using the printer feature.

10. The non-transitory CRM of claim 9, further storing computer readable program code embodied therein that causes the PSP to:
    determine a third printer comprising the printer feature and located within the predetermined distance of the updated location of the user mobile device,
    wherein the updated notification further identifies the third printer,
    wherein the updated notification comprises an XY plot comprising the second printer and the third printer,
    wherein the XY plot comprises a first axis representing distance from the user mobile device and a second axis representing at least one selected from a group consisting of printing fee for the print job and completion time for the print job, and
    wherein the confirmation is a selection of the second printer by a user of the user mobile device.

11. The non-transitory CRM of claim 10, wherein the print job further specifies an authentication credential, and wherein the user inputs the authentication credential at the second printer before the second printer generates the hardcopy document.

12. The non-transitory CRM of claim 9, wherein the printer feature is at least one selected from a group consisting of color printing, duplex printing, three-hole punching, and a paper size.

13. The non-transitory CRM of claim 9, wherein the updated location is specified using global positioning system (GPS) coordinates.

14. The non-transitory CRM of claim 9, wherein the confirmation is at least one selected from a group consisting of a text message and an email.

15. The non-transitory CRM of claim 9, wherein the updated notification comprises a uniform resource locator (URL) link that is selected by the user to generate the confirmation.

16. A system for printing, comprising:
a buffer that stores:
  a print job issued by a user mobile device and specifying a printer feature, a print job identification (ID), and an initial location of the user mobile device, wherein the user mobile device is operated by a user; and
  an updated location of the user mobile device different from the initial location of the user mobile device obtained after a notification is sent to the user mobile device, wherein the print job ID with the updated location are sent by the user mobile device;
a matching engine that:
  obtains the initial location of the user mobile device from the print job;
  determines a first printer having the printer feature and located within a predetermined distance of the initial location of the user mobile device; and
  determines, after the updated location is obtained, a second printer having the printer feature and located within the predetermined distance of the updated location of the user mobile device; and
a messaging engine that:
  sends the notification identifying the first printer to the user mobile device;
  sends an updated notification identifying the second printer to the user mobile device; and
  obtains a confirmation for the second printer issued by the user mobile device in response to the updated notification; and
  sends the print job to the second printer in response to the confirmation,
wherein the second printer generates a hardcopy from the print job using the printer feature.

17. The system of claim 16, further comprising:
a printer repository that stores a plurality of locations of a plurality of printers and a plurality of features of the plurality of printers, wherein the plurality of printers comprises the first printer and the second printer.

18. The system of claim 16, wherein:
the print job further specifies an authentication credential;
the user inputs the authentication credential at the second printer before the second printer generates the hardcopy document; and
the printer feature is at least one selected from a group consisting of color printing, duplex printing, three-hole punching, and a paper size.

19. The system of claim 16, wherein the confirmation is at least one selected from a group consisting of a text message and an email.

20. The system of claim 16, wherein the updated notification comprises a uniform resource locator (URL) link that is selected by the user to generate the confirmation.

* * * * *